(12) United States Patent
Arscott et al.

(10) Patent No.: US 8,910,154 B2
(45) Date of Patent: Dec. 9, 2014

(54) OBTAINING DIAGNOSTIC INFORMATION IN A VIRTUAL ENVIRONMENT

(75) Inventors: Don Arscott, Ottawa (CA); Michael Yeung, Nepean (CA)

(73) Assignee: Mitel Networks Corporation, Ottawa, Ontario (CA)

(*) Notice: Subject to any disclaimer, the term of this patent is extended or adjusted under 35 U.S.C. 154(b) by 388 days.

(21) Appl. No.: 12/928,991

(22) Filed: Dec. 23, 2010

(65) Prior Publication Data

US 2012/0167078 A1 Jun. 28, 2012

(51) Int. Cl.
*G06F 9/455* (2006.01)
*G06F 15/177* (2006.01)
*G06F 11/30* (2006.01)

(52) U.S. Cl.
CPC ............ *G06F 9/455* (2013.01); *G06F 9/45533* (2013.01); *G06F 11/30* (2013.01)
USPC ............................................... 718/1; 709/220

(58) Field of Classification Search
None
See application file for complete search history.

(56) References Cited

U.S. PATENT DOCUMENTS

| | | | | |
|---|---|---|---|---|
| 6,247,057 | B1 * | 6/2001 | Barrera, III | 709/229 |
| 7,725,937 | B1 * | 5/2010 | Levy | 726/23 |
| 8,286,163 | B2 * | 10/2012 | Shinohara et al. | 718/1 |
| 2004/0128670 | A1 * | 7/2004 | Robinson et al. | 718/1 |
| 2010/0095297 | A1 * | 4/2010 | Sethi et al. | 718/1 |
| 2012/0017012 | A1 * | 1/2012 | Bartholomay et al. | 710/51 |
| 2012/0084774 | A1 * | 4/2012 | Post et al. | 718/1 |

* cited by examiner

*Primary Examiner* — Kenneth Tang (57) ABSTRACT

A system and method for service aware virtualization is disclosed. The system comprises a plurality of virtual instances operating on virtualization software and a plurality of service manager modules operating on the virtualization software. Each service manager module is coupled to a separate virtual instance and configured to interface with an operation of guest software operating within the virtual instance on the virtualization software. A management interface coupled to the service manager modules interfaces with the plurality of virtual instances.

17 Claims, 7 Drawing Sheets

OBTAINING DIAGNOSTIC INFORMATION IN A VIRTUAL ENVIRONMENT

BACKGROUND

Figure 1:
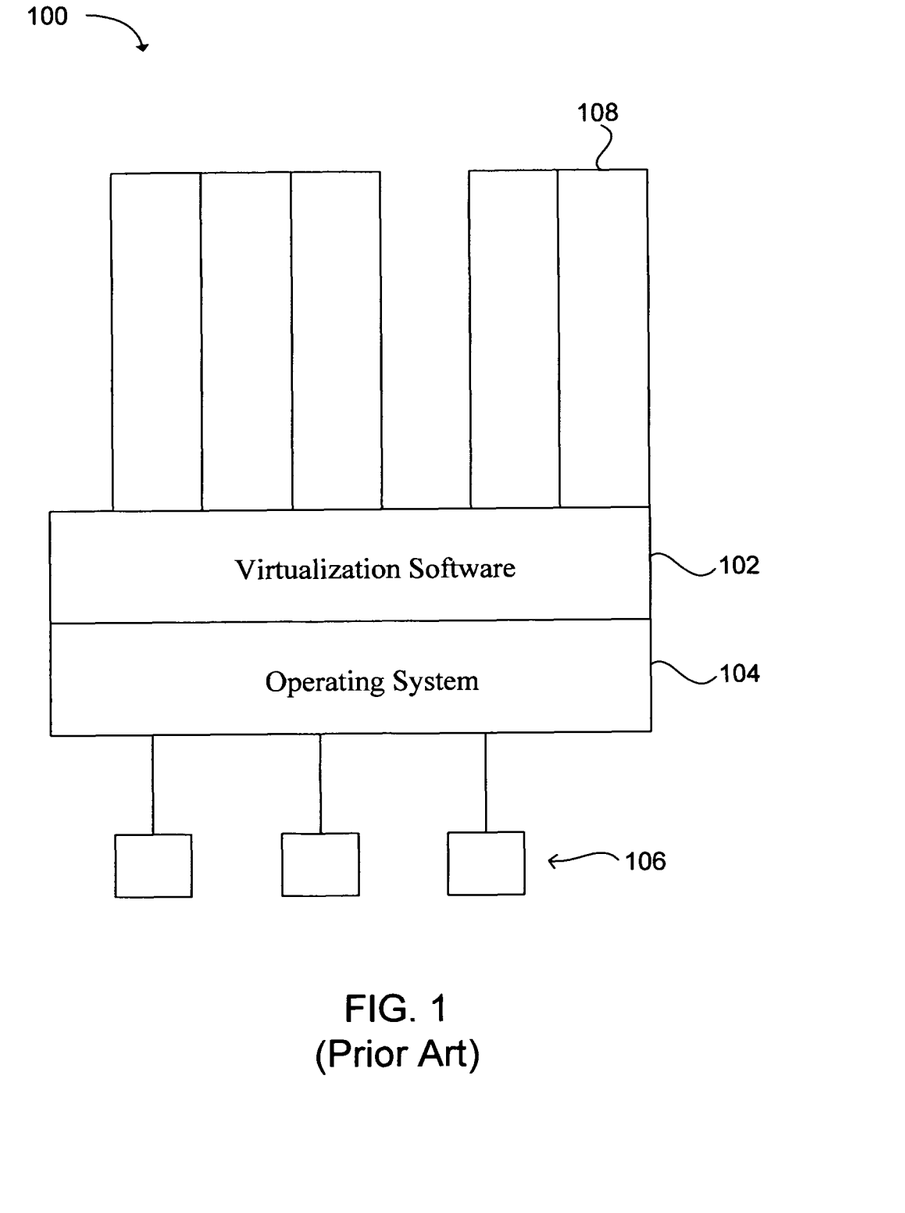
FIG. 1 illustrates a block diagram of a virtualization system in accordance with the prior art.

A typical virtualization system 100 is illustrated in FIG. 1. Virtualization software 102 can run as a conventional application on a server using a standard operating system 104 such as Linux® or Windows®. The virtualization system enables hardware and software system resources to be "virtualized" for the use of other applications. These hardware and software resources are referred to as proxied resources 106 in a virtualized system. The system can run standard software applications within the virtualized system. The applications operating within the virtualization system are referred to as virtual application instances, or virtual instances 108. Each virtual instance typically emulates a computer environment, including an operating system. For instance, the host operating system 104 of the server may be Windows while a virtual instance may run an application on a Linux operating system.

The virtual instance 108 is typically provided with all of the standard interfaces and services that it expects from an operating system through the proxied resources. The virtualization system can supply interfaces to a file system, network communication, memory and other standard supporting infrastructure that is typically supplied by an operating system.

A virtualization system 100 provides a means by which services and hardware resources can be shared across multiple applications without the need to modify the applications to enable such sharing. A system owner can achieve significant savings in hardware costs by running multiple instances of unmodified applications on standard hardware and software.

The virtual instances 108 operating in a virtualization system 100 operate as separate instances without knowledge or interaction with each other. The management of the virtualization infrastructure treats each of these individual applications as a "black box" computing server without knowledge of each application's capabilities and inner workings. This management model is not sufficient for many system owners needs. In particular, a manager does not have the ability to provide service or content oriented support for a system owner that is running large numbers of virtualized instances since each instance operating in a virtualization system is opaque.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

Reference will now be made to the exemplary embodiments illustrated, and specific language will be used herein to describe the same. It will nevertheless be understood that no limitation of the scope of the invention is thereby intended.

DETAILED DESCRIPTION

Definitions

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter. The following definitions are provided for clarity of the overview and embodiments described below.

A service aware virtualization system is disclosed that enables management of multiple virtual instances operating within a virtualization system. The service aware virtualization system provides a "white box" view of the virtual instances operating within the system. A "white box" view refers to the concept of "white box testing", also commonly called "clear box testing". White box testing is a method of testing internal structures or workings of an object or application, as opposed to merely testing the application's functionality, as is typically done in black box testing. In white box testing, an internal perspective of the object is needed to enable testing to be performed on the internal structures and workings of the object. Using black box testing, the usual result is a determination that a virtual instance is enabled. A determination typically cannot be made as to whether an application is running inside the virtual instance, or whether the application is operating correctly. White box testing allows a more detailed analysis to be performed, enabling the root cause of a problem to be located and corrected.

Virtualization systems are typically only capable of black box testing virtual instances. This limitation can be a significant detriment to a system owner of a virtualization system configured to operate dozens or hundreds of different virtual instances. The ability to view inside each instance and monitor the operation of the instances provides a significant advantage. Such a system can be useful in creating and managing services and content that are provided in virtual instances operating on a virtualization system.

For example, communication companies provide solutions for owners that run very large systems. The systems can be used to provide communication and collaboration applications at many sites. Communications companies can also provide hosted services in which many smaller enterprises can lease communication and collaboration services. In both cases, the ability to create and manage the services and content provided by large numbers of virtualized instances of the communication and collaboration application will greatly aid the system owner in providing the desired services.

Figure 2:
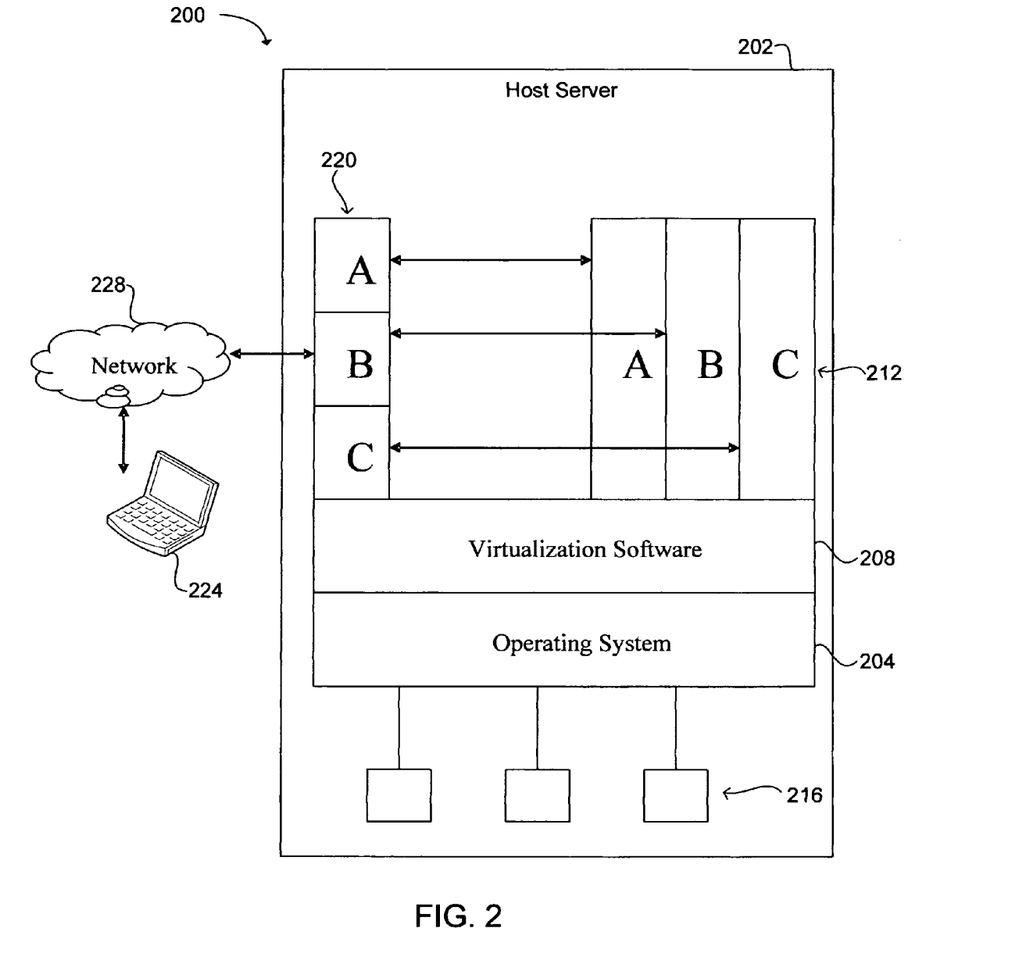
FIG. 2 illustrates an example illustration of a system for providing service aware virtualization in accordance with an embodiment of the present invention.

FIG. 2 provides one example illustration of a system 200 for providing service aware virtualization. The system is comprised of a server 202 configured to run an operating system 204. The operating system can be any type of OS such as Unix®, Linux®, Microsoft®, Apple®, and so forth. The operating system that runs directly on the server can be referred to as the host operating system. Virtualization software 208 can run on the host operating system. The virtualization software may be proprietary software or off-the-shelf software such as VMware®, Oracle VM VirtualBox™, and so forth. There are dozens of types of virtualization software available for use that may be used in the service aware virtualization system, as can be appreciated. In certain embodiments, the operating system 204 and the virtualization software 208 can be combined.

A plurality of virtual instances 212 can operate in the virtualization software. Each virtual instance has access to the proxied resources 216 provided by the server and operating system. Each virtual instance may operate with its own operating system. An operating system that operates within a virtual instance can be referred to as a guest operating system. The operating system in each virtual instance can be distinct from the host operating system 204. Each virtual instance can run its own distinct operating system. Each virtual instance may operate a single application, or a plurality of applications, as occurs with software applications running on a host operating system 204.

The service aware virtualization system 200 also includes a plurality of service manager modules 220 operating within the virtualization software 208. Each service manager module can operate as a separate virtual instance in the virtualization software. In the example illustrated in FIG. 2 the virtual instances 212 are labeled A, B, and C. Similarly, the service manager modules 220 are labeled A, B, and C. The labeling is used to illustrate that each virtual instance is associated with a specific service manager module. Each time a new virtual instance is created within the virtualization software, a new service manager module is created and associated with the virtual instance. The labeling in FIG. 2 is not intended to be limiting. The service aware virtualization system can be used to operate hundreds of different virtual instances within the virtualization software 208 operating on the server 202. Each virtual instance can be associated with a service manager module.

The service manager module 220 provides a process for interfacing the virtual instances 212 to a management station 224. The management station can be a computing device such as a desktop computer or a type mobile computing device such as a laptop computer, a tablet computer, a handheld computing device, a smart phone, and so forth. The management station can be linked to the service manager modules 220 operating on the server 202 through a network connection 228 such as a local area network or an internet connection. The management station can be used to interact with each of the virtual instances 212 through a virtual instance's associated service manager module 220. The interaction may be through automated means operating on the management station, through a manual interaction of a person using a graphical user interface, or a combination of automated and manual interaction. This will be discussed more fully in proceeding paragraphs. The ability to interact with the virtual instances through the associated service manager module can be used to provide effective management capabilities.

In one embodiment, the service aware virtualization system 200 can be used to host one or more virtual instances for a tenant. Multiple tenants may host a plurality of virtual instances on the same server. One attempt to allow a tenant to manage multiple virtual instances is to operate multiple virtual instances within a monolithic architecture. The monolithic architecture can enable the multiple instances to be aware of each other and enable a manger to manage the multiple instances together within the architecture. However, the monolithic architecture creates management challenges. Changes to one virtual instance within the monolithic architecture can affect other instances. Thus, supporting multiple independent tenants in a monolithic tenanting architecture can create difficult design problems that have to be continually addressed as new features are added or as the system evolves.

In contrast, the service aware virtualization architecture 200 illustrated in the example of FIG. 2 provides a clear separation among virtual instances. Thus, multiple tenants can each have multiple virtual instances operating within the service aware virtualization architecture and manage and update software operating within each virtual instance without affecting software in other virtual instances.

The use of service manager modules 220 allows for application-aware white-box testing of the services running in the virtual instances. Without the use of the service manager module, as illustrated in FIG. 1, the virtualization system is application unaware and thus not able to verify and validate the current operation of an instance. Black box type testing can be used to verify that a system appears to be running, but is typically unable to verify that the instance is providing a useful service. If guest software running within a virtual instance is not operating adequately, black box testing may not be useful in verifying the operational abilities of the software.

The service manager module 220 in the service aware virtualization system 200 can be used to perform specific application-aware tests on the virtual instance to verify and validate guest software operating in the virtual instance. For example, a telephony server may operate within one of the virtual instances 212. The telephony server can be configured to provide a selected level of telephony service to a tenant. The telephony server may not be operating correctly, causing it to deliver a lower level of service than it is capable of. The service manage module can be used to perform specific, application-aware tests on the telephony server operating within the virtual instance to verify and validate the service level of the telephony servers operation. These tests can be periodically run. When a failure occurs then alarms can be raised.

Multiple types of systems can be supported by the service aware virtualization architecture. Various types of service manager modules 220 can operate on the virtualization software 208. In addition, different types of relationships between a service manager module 220 and the associated virtual instance 212 are possible to support specific requirements of different types of systems. This will be described more fully in the proceeding paragraphs.

Figure 3:
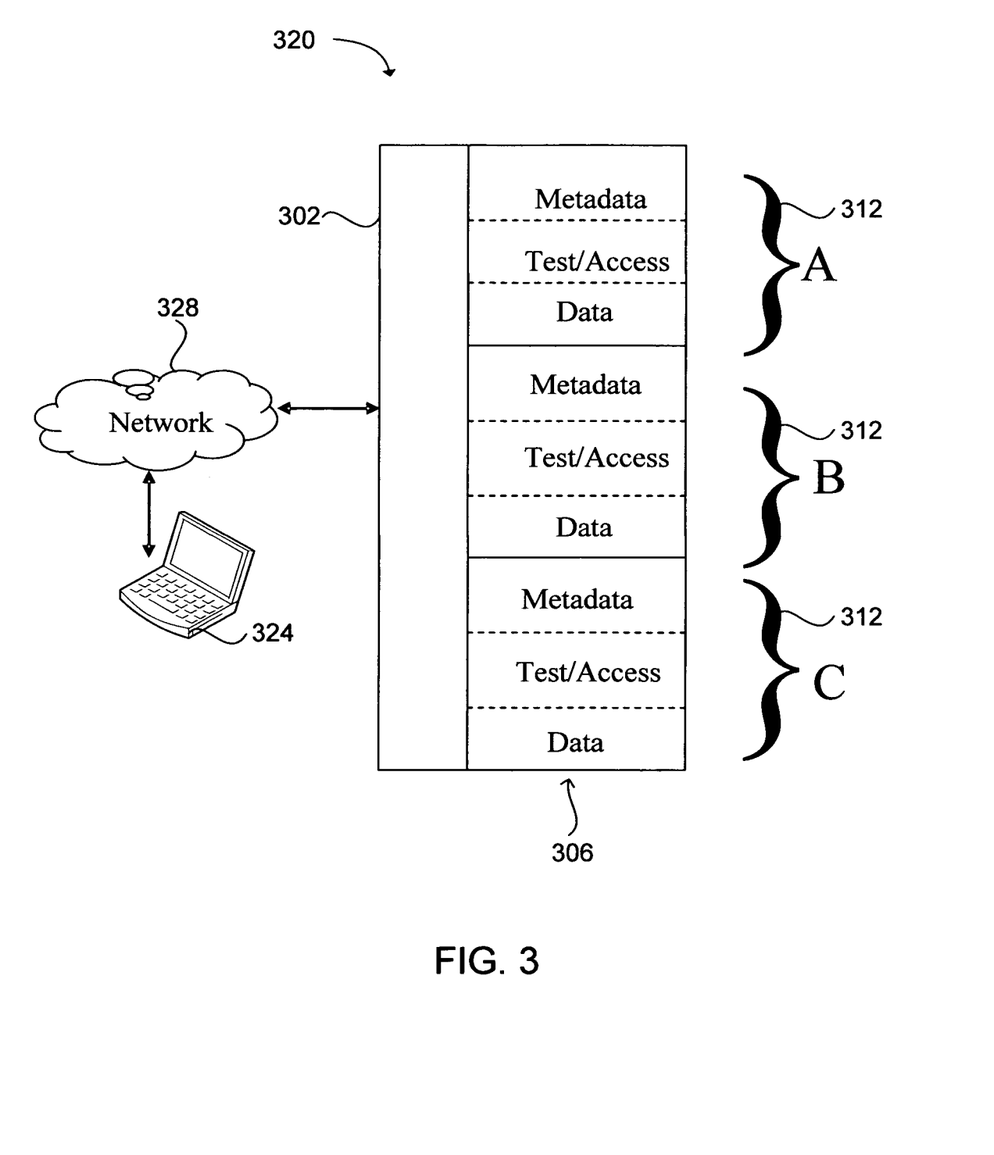
FIG. 3 illustrates a block diagram of an example of a service manager module in accordance with an embodiment of the present invention.

FIG. 3 provides an example of a more detailed illustration of the service manager modules 320. The service manager module can be divided into two primary functional components. A control interface (CI) 302 and an instance interface (II) 306 are shown. The service manager module can provide a single point of contact with the plurality of virtual instances. The operation of the virtual instances can be verified and validated through this single point of contact.

The control interface 302 can be used to connect the service manager module 320 to an external controller 324. As previously discussed, the control interface can be connected to the external controller through a network connection on a network such as a local area network or internet. Other types of connections can be used as well, such as a direct connection to the server. However, the network connection provides the benefit of remote access to the virtual instances.

In one embodiment, the control interface 302 can be implemented as a web server. The web server may have common gateway interface capability. In one example, the control interface web server can serve various types of forms when a request is received. The forms can be used to enable the external controller 324 to control the operation of the service manager module. The service manager module can control the operation of the instance interface 306.

In one embodiment, when a virtual instance 312 is created to operate on virtualization software on a server, an associated instance interface 306 can be created within the service manager module 320. The instance interface can act as the interface between the software operating within the virtual instance and the control interface 302.

As shown in FIG. 3, the instance interface 306 can include three separate divisions: a metadata division, a test division, and a data division. Metadata can contain information that is used to identify, locate, and characterize the dynamic instance. Typical elements that may be embodied within the metadata include:
- an internet protocol (IP) address of the virtual instance 312;
- location information describing the location of the site that the virtual instance is serving, such as a selected university campus;
- application type and revision of the application running in the virtual instance; and
- information that can be used to characterize the application running in the virtual instance.

The data division in the instance interface 306 can consist of generated test data that is used to describe the functionality of an application operating within a virtual instance 312. The test data division can be used as a cache to store test results. The test results can be sent to the external controller 324. In one embodiment, the test data can be sent by the control interface 302 when a request is received from the external controller. Alternatively, the information in the data division of the instance interface can be automatically sent to the external controller.

The test/access division can also be used as a repository for test procedures that can be used to verify and validate the operation of the software operating within a virtual instance 312. The test procedures can be in the form of test scripts. The test script may outline individual tests or a plurality of tests that can be run in sequence or in parallel. The specific test procedures can be stored in the test/access division. The test procedure (i.e. script) may also be stored and run from an external repository, such as the external controller 324. Data from the test can be supplied by the control interface 302 from the data division in the instance interface 306.

There are various system configurations for which specific configurations of the service manager module 320 can be optimized. For example, in one embodiment a system can be managed by more than one autonomous entity. A system provider may be supplying services to multiple tenants. Individual tenants may be supplied with multiple instances to supply services to multiple sites. Each of these tenants may wish to manage their own instance or instances. In such a case, the control interface of FIG. 3 can be adapted to provide the services required to handle multiple tenants.

In one embodiment, the web server operating as the control interface 302 can be configured to require each tenant to provide credentials, such as a user name and password to gain access to selected virtual instances 312. Only when proper credentials are given is the tenant provided access to manage the virtual instance(s) through the control interface 302 and instance interface(s) 306. Tenant indentifying information may be stored within the metadata division of the instance interface. The control interface can be used to identify the instance interfaces for which a tenant has access and supply access to the associated virtual instances through the web server.

In another embodiment, the external controller 324 and the virtual instances 312 may be enabled to function together. That is, the external controller can be configured to send certain queries and instructions to the virtualization software.

For example, the test division of the instance interface 306 can be configured to query the virtualization software for certain parameters related to a specific instance. So for example, CPU load and memory usage may be queried by the external controller. The information can then be reported by the virtualization software and reported to the external controller or another selected location. The application awareness of the external controller will allow for tests in which certain virtualization software parameters are interpreted to have significant meaning within the applications.

For example, in certain instantiations of virtual PBX applications, the number of open TCP sessions (as observed on the host computer) to a specific set or range of IP addresses can be interpreted to be a count of the number of resisted telephones. Another example involves the testing and monitoring of voice quality. This can provide a powerful tool for fault point isolation and service level agreement enforcement.

Figure 4:
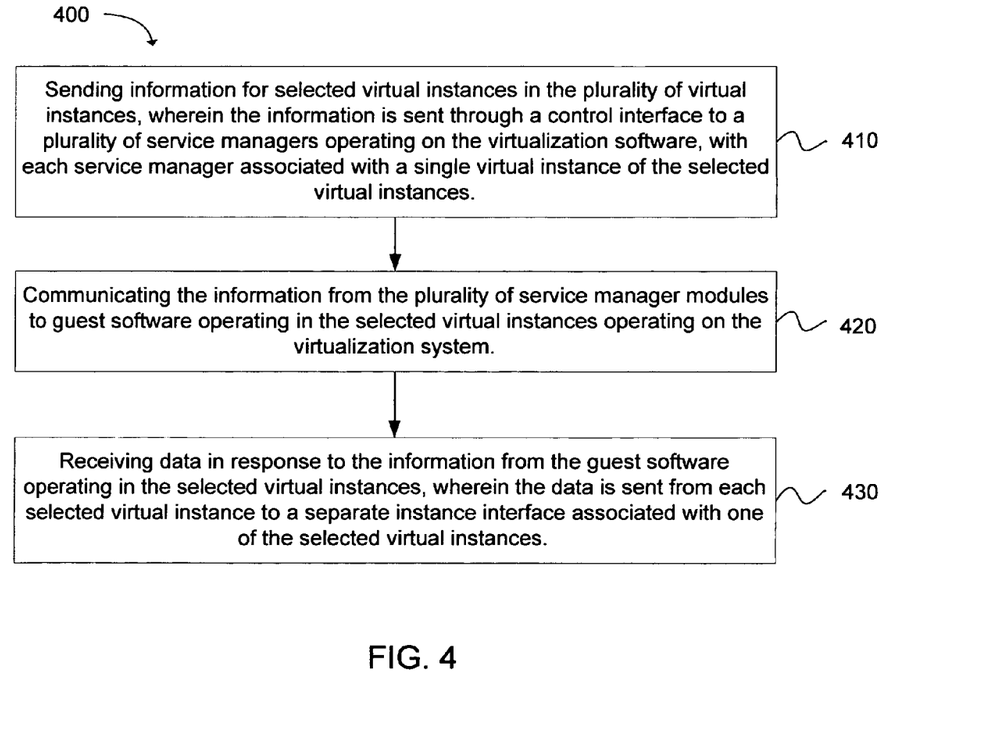
FIG. 4 depicts a flow chart of a method for service aware virtualization in accordance with an embodiment of the present invention.

In accordance with one embodiment of the present invention, a method 400 for service aware virtualization on a computer server operating virtualization software is depicted in a flow chart illustrated in FIG. 4. The method comprises sending 410 information for selected virtual instances in the plurality of virtual instances. The information is sent through a control interface to a plurality of service managers operating on the virtualization software. Each service manager is associated with a single virtual instance of the selected virtual instances, as previously discussed.

The method 400 further comprises communicating 420 the information from the plurality of service manager modules to guest software operating in the selected virtual instances operating on the virtualization software. Data can be received 430 in response to the information from the guest software operating in the selected virtual instances. The data is sent from each selected virtual instance to a separate instance interface associated with one of the selected virtual instances.

Services Provided by the Service Aware Virtualization Architecture

A number of specific services can be provided by the service aware virtualization system. These services may be supplied in certain embodiments. Each service is enabled by the system but is not essential to it. These services are supplementary to the system.

Performance Management

As previously discussed, the service aware virtualization system can allow for directed and scripted tests of software applications operating within virtual instances. Tests can be initiated in the control interface. The test can connect to the operating guest software within a virtual instance and perform functional tests on the operating guest software.

For example, in one embodiment a telephony server such as a virtual private branch exchange (PBX) may be operating within a selected virtual instance. A test may be created in which a simulated virtual telephone may attempt to register and de-register with the PBX. Success or failure in this operation can verify that the PBX application is functional and validate that it is supplying the expected services. The test may be extended to enable the inter-working of multiple simulated devices to be tested and validated. This enables a tester to determine that proper feature operation is occurring when calls are transferred between simulated telephones and telephony trunks. For instance, tests can be used to verify that proper display messages are sent to simulated telephones.

In one embodiment, the testing with simulated devices can be directed to telephony transmission and networking parameters. Simulated devices can be placed into a connection. Parameters such as delay, jitter, packet loss, and so forth can be determined. This testing may be done continually in the background, thereby enabling temporary and transitory failures to be detected.

The test script can be stored in the test/access division in the instance interface 306. The data from one or more virtual instances 312 can be communicated to the data division in the associated instance interface. The data can then be communicated by a web server operating as the control interface 302 over a network 328 to an external controller 324. The data may be automatically stored by the external controller. The data can then be accessed and analyzed at a later time. Alternatively, the external controller may include a graphical user interface that can be use to monitor test data in near real-time.

Figure 5:
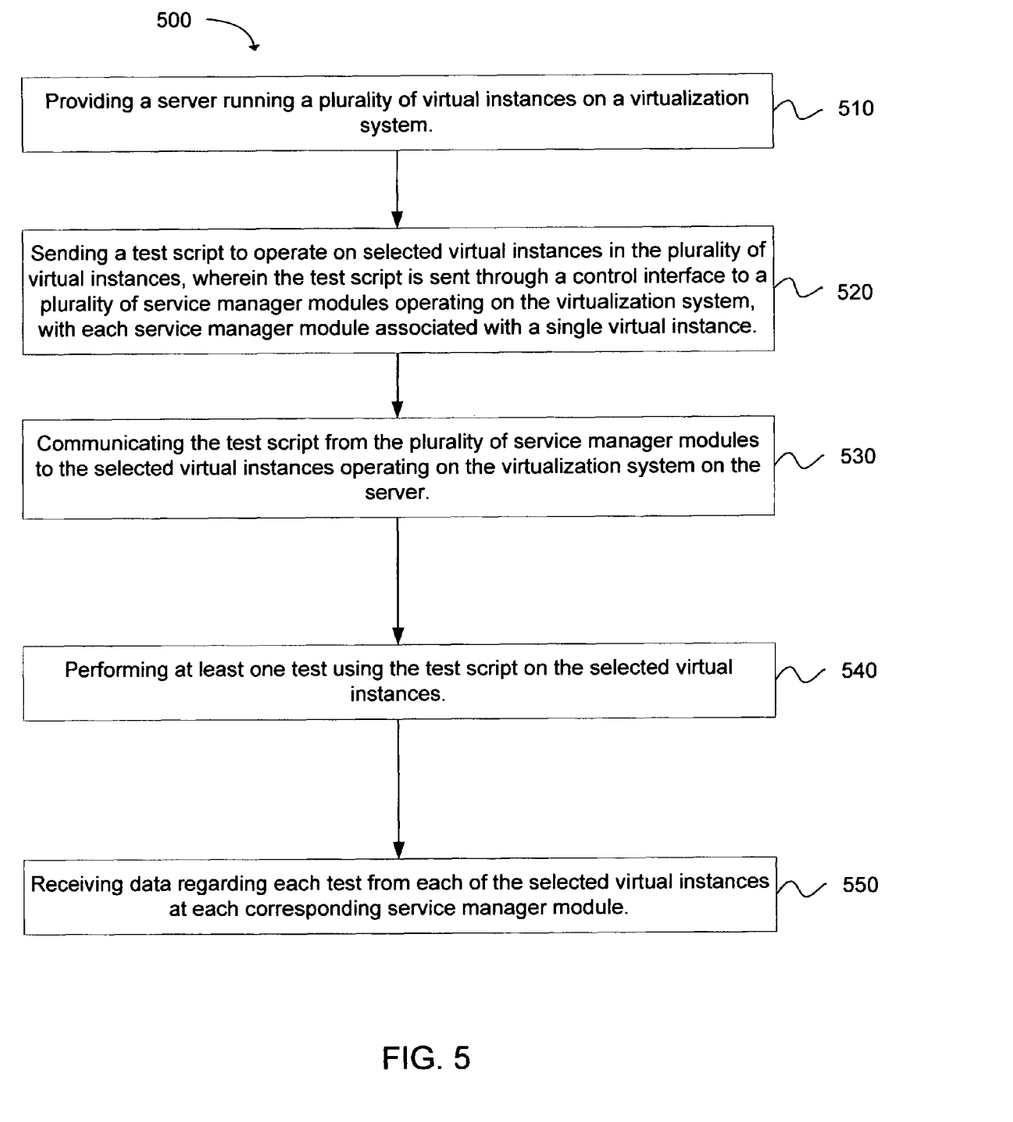
FIG. 5 depicts a flow chart of a method for conducting an application-aware test in a virtual environment in accordance with an embodiment of the present invention.

In one embodiment, a method 500 for conducting an application-aware test in a virtual environment is disclosed, as depicted in the flow chart of FIG. 5. The method comprises providing 510 a server running a plurality of virtual instances on virtualization software. A test script is sent 520 to operate on selected virtual instances in the plurality of virtual instances. Each service manager module is associated with a single virtual instance. In one embodiment, a separate test script can be sent for each virtual instance.

The test script can be sent through a control interface to a plurality of service manager modules operating on the virtualization software. The test script may be sent from the management interface to the control interface that is part of the service manager module. The test script can then be sent from the control interface to the instance interface, as previously discussed. Each instance interface is coupled with a selected virtual instance. The test script can be communicated to the appropriate instance interface (associated with a selected virtual instance) based on identification information included in each of the separate test scripts. In one embodiment, metadata associated with each separate test script can be sent to the control interface. The metadata can contain the identification information for the virtual instance that the test script is configured to operate on to enable the control interface to communicate the test script to a desired virtual instance.

The method 500 further comprises communicating 530 the test script from the plurality of service manager modules to the selected virtual instances operating on the virtualization software on the server. At least one test is performed 540 using the test script on the selected virtual instances. The at least one test may be performed in parallel on the selected virtual instances. Alternatively, the test(s) may be performed in series. Data is received 550 in response to each test from at least one of the selected virtual instances at each corresponding service manager module. In one embodiment, the data output from one of the selected virtual instances can be used as input data for a test on another of the selected virtual instances.

The corresponding service manager module is the service manager module that is associated with the virtual instance. For example, in FIG. 3, the corresponding service manager module for virtual instance A is service manager module A. Similarly, virtual instance A corresponds with service manager module B, virtual instance C corresponds with service manager module C, and so forth.

In another embodiment, a test script may be configured to validate a function of a virtual instance. When a plurality of tests are run, each separate test script may be used to validate each separate virtual instance. At least one of the separate test scripts can be used to test a virtual instance operating as a virtual device.

In one embodiment, the data that is received in response to each test may be test data. Alternatively, other types of data may also be communicated. For instance, each virtual instance may contain a set of predefined thresholds. The thresholds may be configured using the service manager. An overrun of a predefined threshold can also trigger the transfer of data to the corresponding service manager. In another example, loopback testing may be initiated by selected service managers for their corresponding virtual instances. For instance, two virtual instances can be connected in a loopback mode and the testing can be used to isolate an issue between boundaries, such as intra-instance boundaries (i.e. within the virtual instance) versus intra-server boundaries (i.e. within the hosting server) versus inter-server boundaries (i.e. across a network). Credentials (such as identification information, password, and so forth) can be provided to the control interface to gain access to the plurality of service manager modules operating on the virtualization system. The credentials may allow access to selected service manager modules associated with a user's virtual instances.

Bulk Data Management

A single system owner or tenant will often manage multiple virtual instances running guest software applications. As previously discussed, the metadata division of the instance interface in each service manager module may contain identification information. For example, the metadata can include a site identification value and classification information for each site. The classification information can depend on the type of services operating in each virtual instance. In one example, virtual instances may be classified based on marketing, logistics, or other desired classification groups.

In one embodiment, the control interface can be configured to respond to received instructions from the external controller for multiple sites at one time. The management instructions may be test scripts, data queries, software updates, and so forth.

Using the metadata information, the instructions may be specified using any number of system classifications. For example, an instruction may be sent to guest software operating in selected virtual instances for a certain physical site that the software is used to operate, for all sites within a certain state, for all marketing sites, for all sites owned by a certain tenant, and so on.

In another example, a single data update may be specified to take place for guest software operating in virtual instances to operate selected sites. The ability to update data at each selected site can substantially reduce the amount of time an employee will spend updating a site. In addition, the accuracy of the updates can be improved since the chance for human error is reduced when the update does not have to be performed repetitively multiple times for multiple virtual instances.

The bulk management framework provides the ability to perform the same set of operations across selected virtual instances or a range of virtual instances. These operations can include software upgrade(s), software licensing, database backup and restore, fault monitoring, creation and/or deletion of a file in a virtual instance, startup and/or shutdown of an application in a virtual instance, operational monitoring, loading monitoring, and service level agreement monitoring.

Figure 6:
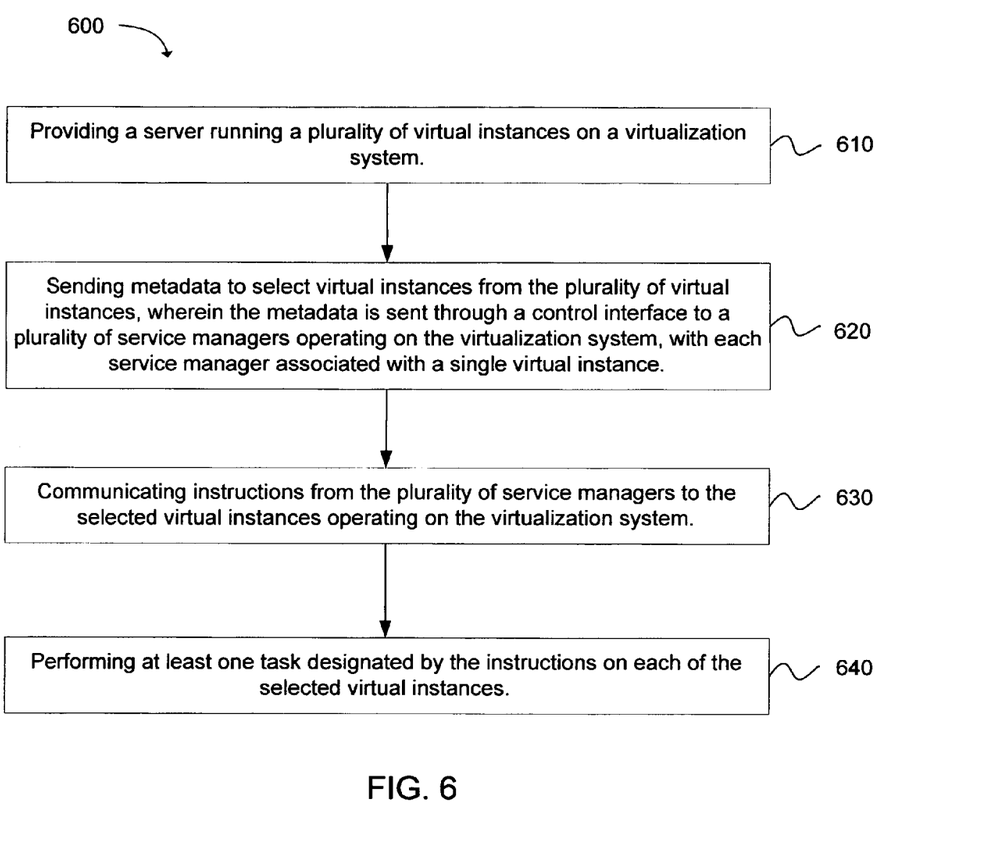
FIG. 6 depicts a flow chart of a method for bulk data management in a virtual environment in accordance with an embodiment of the present invention.

In another embodiment, a method 600 for bulk data management in a virtual environment is disclosed, as depicted in the flow chart of FIG. 6. The method comprises the operation of providing 610 a server running a plurality of virtual instances on a virtualization system. Metadata is sent 620 to select virtual instances from the plurality of virtual instances. The metadata is sent through a control interface to a plurality of service managers operating on the virtualization system, with each service manager associated with a single virtual instance. The metadata may be sent from the control interface to a selected instance interface coupled to a selected virtual instance based on identification information included in the metadata. In one embodiment, the metadata containing identification information can be sent for the virtual instance that the task is designated to be performed at to enable the control interface to communicate the instructions to a desired virtual instance. The selected virtual instances may be designated via identification information for virtual instances operating on the virtualization software. For instance, the selected virtual instances may be designated based on a site location for which the virtual instance operates, a state in which a virtual instance operates, a company for which a virtual instance operates, a type of business for which a virtual instance operates, and so forth.

The method 600 further comprises communicating 630 instructions from the plurality of service managers to the selected virtual instances operating on the virtualization system. In one embodiment, the instructions may be sent from an external controller to the plurality of service managers. Each instruction can be sent to a selected service manager based on address information in the metadata. At least one task can be performed 640 based on the instructions for each of the selected virtual instances. A response can be sent from each virtual instance on which the task is performed. The response can be sent through the control interface to a management interface to enable a determination to be made as to whether the task was performed at each selected virtual instance.

In one embodiment, the at least one task can be performed at the selected virtual instances in parallel. Alternatively, the at least one task may be performed at the selected virtual instances in series. For example, where an output of one task may be used as an input for another task, the tasks may be performed in series. One task that may be performed involves updating selected data on each of the designated virtual instances to enable the data to be updated across at least one selected classification of sites.

Selection of Diagnostic Information

The ability to obtain diagnostic information from applications at a selected time can be very beneficial to perform debugging of anomalous performance of the application. Guest software applications operating in virtual instances can suffer the same issue of anomalous performance as happens with applications that are run directly on a host server. The added layer of the virtualization software can often add additional debugging challenges.

In one embodiment, the service manager module for each virtual instance can allow for the provision of instructions that can be sent to the virtual instance. One of these instructions can be used to request the dumping of diagnostic data from selected virtual instances. This data can include information such as the current contents of internal databases, critical state variables, and so forth. Any data that can be used in debugging anomalous features can be sent from each selected virtual instance. The diagnostic data can be sent from each selected virtual instance to the data division of the instance interface in each service manager module. The data can then be communicated to an external controller. A graphical user interface can be used to enable a user to view the diagnostic data, either on the controller or at a separate computing device.

Figure 7:
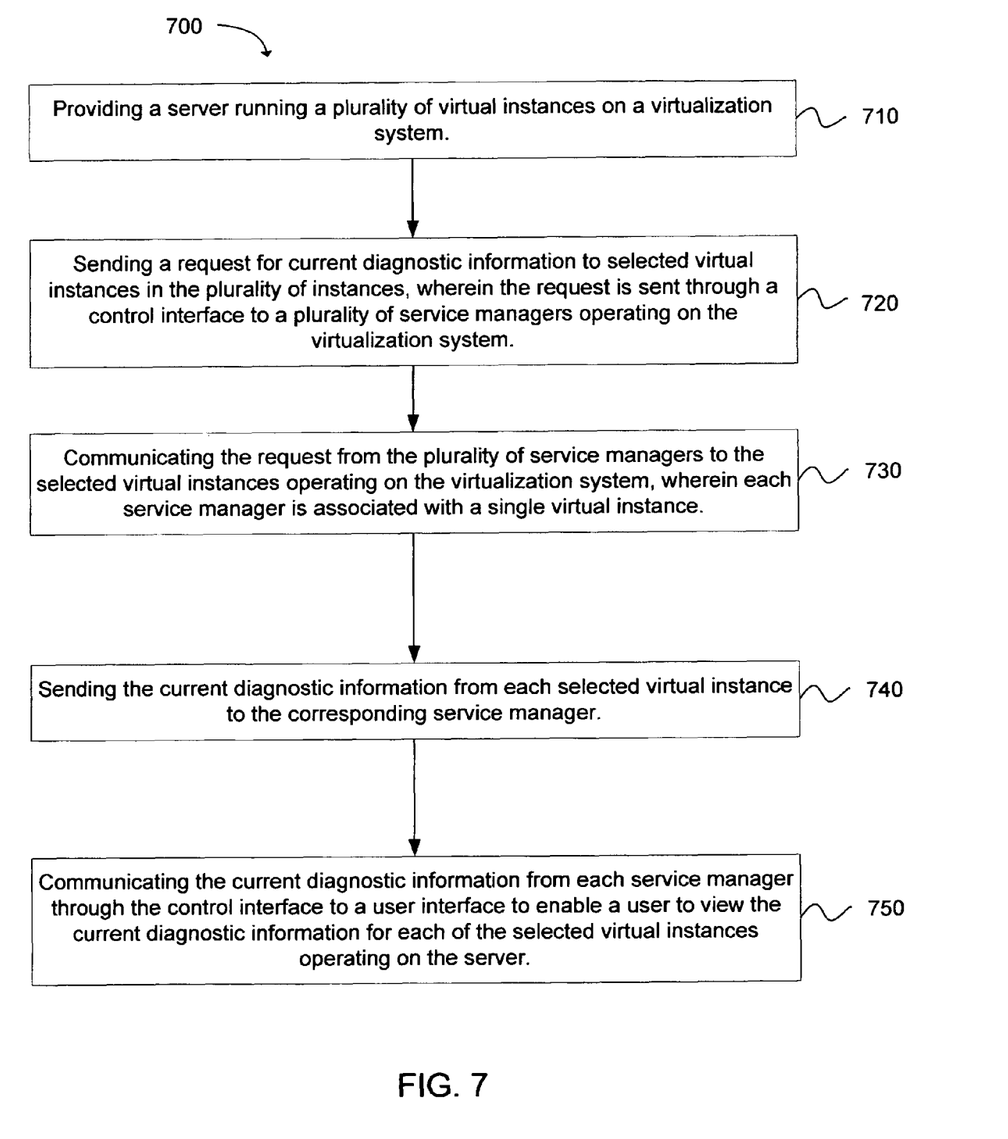
FIG. 7 depicts a flow chart of a method for obtaining diagnostic information at a selected time in a virtual environment in accordance with an embodiment of the present invention.

In one embodiment, a method 700 for obtaining diagnostic information at a selected time in a virtual environment is disclosed, as depicted in the flow chart of FIG. 7. The method comprises providing 710 a server running a plurality of virtual instances on a virtualization system. A request is sent 720 for current diagnostic information to selected virtual instances in the plurality of instances. The request is sent through a control interface to a plurality of service managers operating on the virtualization system. The request can include a selected runtime (i.e. a desired time after an application begins running) at which to provide the current diagnostic information for each of the virtual instances. The request for current diagnostic information at the selected runtime can be sent to the selected virtual instances. The selected runtime can be substantially the same for each selected virtual instance to enable the current diagnostic information to be sent substantially simultaneously to the corresponding service manager. The request is communicated 730 from the plurality of service managers to the selected virtual instances operating on the virtualization system. Each service manager is associated with a single virtual instance.

In one embodiment, metadata can be sent from the control interface to a selected instance interface coupled to a selected virtual instance based on identification information included in the metadata. The metadata is sent containing identification information for the virtual instance that current diagnostic information is to be requested from in order to enable the control interface to communicate the request to a desired virtual instance. In one embodiment, credentials can be provided to the control interface to enable a user to gain access to the plurality of service managers operating on the virtualization system. The credentials provided may enable the user to have access to one or more of the service managers, with each service manager coupled to a selected virtual instance.

The virtual instances to which a request is sent may be designated (i.e. selected) based on at least one of a site location for which the virtual instance operates, a state in which a virtual instance operates, a company for which a virtual instance operates, a type of business for which a virtual instance operates, and so forth.

The method 700 further comprises 740 sending the current diagnostic information from each selected virtual instance to the corresponding service manager. The current diagnostic information is communicated 750 from each service manager through the control interface to a user interface to enable a user to view the current diagnostic information for each of the selected virtual instances operating on the server. The current diagnostic information that is communicated from each service manager can include current contents of selected databases operating in the instance. The information can also include state variables operating in an instance. The current diagnostic information may be communicated to a graphical user interface configured to view the current diagnostic information from each of the selected virtual instances.

In one embodiment, a reset command can be sent to the selected virtual instances in the plurality of instances through the control interface to the plurality of service managers. The reset command can be communicated from the plurality of service managers to the selected virtual instances operating on the virtualization system to enable each of the selected virtual instances to be reset. The reset command to reset each of the selected virtual instances may be sent after the virtual instances have sent the current diagnostic information. The reset command may be sent to reset each of the selected virtual instances substantially in parallel. Alternatively, the resent command may be sent to allow selected virtual instances to be reset in a desired sequence (i.e. order).

In one embodiment, the request for current diagnostic information includes a selected runtime to provide the current diagnostic information for each of the virtual instances. This enables a manager or other person to select a specific runtime, enabling the manager to view the diagnostic data at a selected time, such as just before an anomalous instance occurs in a guest application operating in a virtual instance. This significantly improves the ability of the manager to debug applications running on the virtual instances.

The request for current diagnostic information can also be used to trigger various built-in diagnostic self-test sites inside each virtual instance. The selected diagnostic self-test can be dynamically determined by the service manager based on diagnostic information collected from the virtual instance.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

It should be understood that many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

Various techniques, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A method for obtaining diagnostic information at a selected time in a virtual environment, comprising:
providing a server configured to host a virtualization system running a plurality of virtual instances, a plurality of service managers operating within the virtualization system, wherein each of the plurality of service managers is associated with a respective single virtual instance;
sending a request for current diagnostic information to selected virtual instances in the plurality of instances, wherein the request is sent through a control interface to the plurality of service managers operating on the virtualization system;
communicating the request from the plurality of service managers to the selected virtual instances operating on the virtualization system;
sending the current diagnostic information from each selected virtual instance to the corresponding service manager;
communicating the current diagnostic information from each service manager through the control interface to a user interface to enable a user to view the current diagnostic information for each of the selected virtual instances operating on the server;
sending a reset command to the selected virtual instances in the plurality of instances through the control interface to the plurality of service managers; and
communicating the reset command from the plurality of service managers to the selected virtual instances operating on the virtualization system to enable each of the selected virtual instances to be reset.

2. The method of claim 1, wherein communicating the current diagnostic information from each service manager further comprises communicating current contents of selected databases operating in the instance and state variables operating in the instance.

3. The method of claim 1, further comprising sending a request for current diagnostic information to the selected virtual instances, wherein the request includes a selected runtime to provide the current diagnostic information for each of the virtual instances.

4. The method of claim 3, further comprising sending the request for current diagnostic information at the selected runtime to the selected virtual instances, wherein the selected runtime is substantially the same for each selected virtual instance to enable the current diagnostic information to be sent substantially simultaneously to the corresponding service manager.

5. The method of claim 1, further comprising sending the reset command to reset each of the selected virtual instances after sending the current diagnostic information.

6. The method of claim 1, further comprising sending the reset command to reset each of the selected virtual instances in parallel.

7. The method of claim 1, further comprising sending the reset command to reset each of the selected virtual instances in sequence.

8. The method of claim 1, further comprising designating the selected virtual instances via identification information for virtual instances operating on the virtualization system.

9. The method of claim 1, further comprising designating the selected virtual instances based on at least one of a site location for which the virtual instance operates, a state in which a virtual instance operates, a company for which a virtual instance operates, and a type of business for which a virtual instance operates.

10. The method of claim 1, further comprising communicating the current diagnostic information to a graphical user interface configured to view the current diagnostic information from each of the selected virtual instances.

11. The method of claim 1, further comprising sending metadata from the control interface to a selected instance interface coupled to a selected virtual instance based on identification information included in the metadata.

12. The method of claim 1, further comprising sending metadata containing identification information for the virtual instance that current diagnostic information is to be requested from to enable the control interface to communicate the request to a desired virtual instance.

13. The method of claim 1, further comprising providing credentials to the control interface to gain access to the plurality of service managers operating on the virtualization system.

14. The method of claim 1, further comprising sending a request for current diagnostic information to the selected virtual instances, wherein the request includes a selected runtime at which to provide the current diagnostic information for each of the virtual instances.

15. The method of claim 14, further comprising sending the request for current diagnostic information at the selected runtime to the selected virtual instances, wherein the selected runtime is substantially the same for each selected virtual instance to enable the current diagnostic information to be sent substantially simultaneously to the corresponding service manager.

16. A computer program product, comprising a non-transitory computer usable medium having a computer readable program code embodied therein, said computer readable program code adapted to be executed to implement a method for obtaining diagnostic information at a selected time in a virtual environment operating on a server running a plurality of virtual instances on a virtualization system, comprising:
sending a request for current diagnostic information to selected virtual instances in the plurality of instances residing on the virtualization system, wherein the request is sent through a control interface to a plurality of service managers operating on the virtualization system, wherein each service manager is associated with a respective single virtual instance;
communicating the request from the plurality of service managers to the selected virtual instances operating on the virtualization system;
sending the current diagnostic information from each selected virtual instance to each virtual instance's corresponding service manager;
communicating the current diagnostic information from each service manager through the control interface to a user interface to enable a user to view the current diagnostic information for each of the selected virtual instances operating on the server;
sending a reset command to the selected virtual instances in the plurality of instances through the control interface to the plurality of service managers; and
communicating the reset command from the plurality of service managers to the selected virtual instances operating on the virtualization system to enable each of the selected virtual instances to be reset.

17. A method for obtaining diagnostic information at a selected time from a plurality of virtual instances operating running on a virtualization system on a server comprising:

sending a request for current diagnostic information at the selected time from selected virtual instances in the plurality of instances running on the virtualization system residing on the server, wherein the request is sent through a control interface to a plurality of service managers operating on the virtualization system, wherein each service manager is associated with a respective single virtual instance;

communicating the request from the plurality of service managers to the selected virtual instances operating on the virtualization system;

sending the current diagnostic information from each selected virtual instance to each virtual instance's corresponding service manager;

transferring the current diagnostic information to a desired location to enable a user to access the current diagnostic information;

sending a reset command to the selected virtual instances in the plurality of instances through the control interface to the plurality of service managers; and communicating the reset command from the plurality of service managers to the selected virtual instances operating on the virtualization system to enable each of the selected virtual instances to be reset.

* * * * *